United States Patent
Malomsoky et al.

(10) Patent No.: US 7,630,335 B2
(45) Date of Patent: Dec. 8, 2009

(54) LOCATION SIGNALING FOR LARGE-SCALE, END-TO-END, QUALITY-OF-SERVICE MONITORING OF MOBILE TELECOMMUNICATION NETWORKS

(75) Inventors: Szabolcs Malomsoky, Szentendre (HU); István Szabó, Budapest (HU)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 698 days.

(21) Appl. No.: 10/595,071

(22) PCT Filed: Aug. 7, 2003

(86) PCT No.: PCT/IB03/02510

§ 371 (c)(1),
(2), (4) Date: Jan. 30, 2006

(87) PCT Pub. No.: WO2005/015934

PCT Pub. Date: Feb. 17, 2005

(65) Prior Publication Data

US 2007/0082645 A1    Apr. 12, 2007

(51) Int. Cl.
*H04W 4/00* (2009.01)
*H04L 12/28* (2006.01)
*H04W 24/00* (2009.01)

(52) U.S. Cl. ............... 370/328; 370/241; 456/423; 456/226.1

(58) Field of Classification Search ............ 370/328, 370/241; 455/423, 226.1
See application file for complete search history.

(56) References Cited

U.S. PATENT DOCUMENTS

| | | | | |
|---|---|---|---|---|
| 7,328,262 | B2 * | 2/2008 | McDonagh et al. | 709/224 |
| 7,558,234 | B2 * | 7/2009 | Dommaraju et al. | 370/328 |
| 2002/0155825 | A1 | 10/2002 | Haumont et al. | |
| 2004/0248583 | A1 * | 12/2004 | Satt et al. | 455/452.2 |

FOREIGN PATENT DOCUMENTS

| WO | WO 01/95657 A | 12/2001 |
|---|---|---|
| WO | WO 02/39673 A | 5/2002 |

OTHER PUBLICATIONS

"Managing Quality of Service, Security, Roaming Scenarios and Charging Functions in the new GPRS Packet-Switched Domain," IEEE, Oct. 30, 2001, p. 230, lines 46-52.
M. Bilgic, et al., "Quality of service in general packet radio service," Mobile Multimedia Communications, IEEE International Workshop on San Diego, CA, USA, Nov. 15-17, 1999, IEEE, Piscataway, NJ, USA, Nov. 15, 1999, pp. 226-231.
European Patent Office International Search Report for PCT/IB03/02510 dated Jul. 5, 2004.

* cited by examiner

*Primary Examiner*—Barry W Taylor

(57) ABSTRACT

A method, network, and device for measuring and analyzing packet-switched traffic in a packet-switched radio telecommunication network. When cell-level location information for a mobile station (1) changes due to a handover, the location information is transmitted toward a packet core network (9) by adding the information to userplane packet headers such as a GPRS Tunneling Protocol (GTP) header (26). The measurement device measures the cell-level location information at a level (15*b*) in the network where the information from a plurality of mobile stations (1) is aggregated, together with PDP context information prior to analyzing information for the entire network.

15 Claims, 6 Drawing Sheets

LOCATION SIGNALING FOR LARGE-SCALE, END-TO-END, QUALITY-OF-SERVICE MONITORING OF MOBILE TELECOMMUNICATION NETWORKS

BACKGROUND OF THE INVENTION

1. Technical Field of the Invention

The present invention relates generally to mobile telecommunication networks. More particularly, and not by way of limitation, the invention is directed to a location-signaling system and method for large-scale end-to-end quality-of-service monitoring of packet-switched telecommunication networks.

2. Description of Related Art

The detailed analysis of live General Packet Radio System (GPRS) and UMTS networks is of increasing importance as traffic on these networks increases and traffic measurements become available. Traffic measurements from these networks are extremely useful when analyzing such areas as network utilization information, network performance information indicating whether the users are getting what they paid for or what they expect, bottleneck information identifying bottlenecks in the network, system enhancement information for enhancing the network so that identified problems are eliminated, and dimensioning information for re-dimensioning of cells, links, and the like.

In the case of a circuit-switched service such as voice, for example, it has conventionally been sufficient to measure the call intensities, call durations, and the ratio of blocked calls to successful calls. In the case of packet-switched services such as Web browsing, File Transfer Protocol (FTP) services, e-mail, Multimedia Messaging Services (MMS), and the like, the above tasks are not at all trivial because the end-to-end or user-perceived performance depends on the interaction of many protocols at different interfaces and on various protocol layers. Furthermore, the use of shared resources leads to rather complicated queuing phenomena, which are difficult to model and analyze.

It is envisioned that measurement-based network analysis will soon become a primary tool for the network operator. In order to perform the measurements in a cost-effective manner, the measurement equipment should be inexpensive, and the number of measurement points should be limited to reduce equipment costs and to minimize having to synchronize measurements taken at different points in the network.

Measurement-based characterization of GPRS networks has been described in a document entitled, "Wireless Service Usage and Traffic Characteristics in GPRS networks", by Roger Kalden, Tamás Varga, Bianca Wouters, and Bart Sanders (18th International Teletraffic Congress, Berlin, Germany, 31 Aug. through 5 Sep. 2003). In this document, packets on the so-called Gi interface are captured. The Gi interface connects the Gateway GPRS Support Node (GGSN) with external packet data networks and service providers such as Internet Service Providers (ISPs). Based on the Gi traffic traces, detailed traffic and end-to-end performance analysis results are delivered to operators. In order to identify user sessions (i.e., which user the packets belong to), communications between the GGSN and a Remote Authentication Dial-In User Service (RADIUS) server are also monitored.

When it is also desired to relate the end-to-end quality measurements and traffic load measurements to cells, this can be accomplished by capturing cell-level location information. Concerning the availability of this location information, two types of networks can be differentiated. In the first network type, the cell-level location information is only available in the radio access network (network of base stations and their controllers), while in the second network type, the cell-level location information is also available in the core network (network connecting access networks and other service networks).

For example, the mobility management architectures of GPRS and UMTS are different. In order to track the mobile stations, the cells in a GPRS/UMTS service area are partitioned into several groups. To deliver services to a mobile station, the cells in the group covering the mobile station page the mobile station to establish a radio link. To detect a location change of a mobile station, the cells broadcast their cell identities. The mobile station periodically listens to the broadcast cell identity, and compares it with a cell identity stored in the mobile station's buffer. If the comparison indicates that the location has changed, then the mobile station sends a location update message to the network.

In the GPRS/UMTS (R'99), procedures such as Attach, Paging, and Location Update are defined separately for circuit-switched and packet-switched services. In the circuit-switched domain, cells are partitioned into location areas. Visiting Location Registers (VLRs) track the location area of the mobile station. In the packet-switched domain, the cells are partitioned into routing areas. A routing area is typically a subset of a location area. The SGSN tracks the routing area of the mobile station.

In GPRS, the SGSN also tracks the cell of a mobile station when packets are delivered between the mobile station and the SGSN. In UMTS, the cells in a routing area are further partitioned into UMTS Terrestrial Radio Access Network (UTRAN) routing areas (URA). The UTRAN tracks the URA and the cell of the mobile station.

In the evolution from GPRS to UMTS, the UTRAN radio access network has been introduced, and radio-related mobility management is moved from the core network to the UTRAN as described in "3GPP TS 23.060 V3.14.0, General Packet Radio Service, Service Description, Stage 2, Release 1999, 2002-12". This means that cell-level and URA-level location information is not communicated towards the core network.

Cell-level location information can be captured from the Radio Resource Control (RRC) protocol at the so-called Iub interfaces between the base stations and the Radio Network Controller (RNC), or by extracting the information from the RNC. Both solutions, however, have disadvantages. Firstly, in the UTRAN, the number of Iub links can be rather high. Since reliable statistical analysis of a network requires a large amount of network-wide data, the first solution would be rather complicated. The number of measurement points would be rather high, and the problem of collecting and merging measurement data from these points to the data processing location would have to be solved. The second solution suffers from the disadvantage that users are identified in RRC cell-update signaling by temporary IDs (i.e., cell radio network temporary identity (RNTI) and UTRAN RNTI). The time-varying nature of these IDs makes it difficult to associate the transactions measured at higher aggregation points with a mobility pattern tracked in an RRC trace. Furthermore the needed information in the RNCs is stored in a vendor-specific manner. Therefore, a measurement system that can be used in any type of UTRAN cannot be based on extracting information from the RNC. Yet another drawback is that, in order to ensure network security, safe operation of network nodes, and the like, operators typically do not allow for measuring teams (which may be external) to access important network nodes such as the RNC. Therefore, a solution with passive tapping at a standardized network interface is favored.

Thus there is a particular need for a cost-effective passive monitoring method that can be applied in the current mobility management architecture of UMTS networks.

SUMMARY OF THE INVENTION

The present invention is directed to a location-signaling system and method for large-scale end-to-end quality-of-service monitoring of packet switched telecommunications networks. The invention is especially useful for Universal Mobile Telecommunications System (UMTS) networks in which the detailed mobility information is only available in an access network where the level of aggregation is not sufficient for reliable passive measurement-based characterization. An important advantage of the invention is that only a few measurement points are needed. It is also advantageous that the existence of the cell-level location information in the UTRAN-to-core-network communication can be switched off in regular operation so that no extra load is generated in the network, and the operation of the network is left unchanged.

Accordingly, it is an object of the invention to enable cost-efficient collection of cell-level location information in the current mobility management architecture of mobile networks, especially UMTS networks.

The invention communicates cell-level location information towards the core network, and this information is later used by passive monitoring devices.

For a hard handover, the identity of the new cell is communicated towards the SGSN over the Iu interface. For a soft handover (i.e., for handover between dedicated channels), the identities of the cells in the new active set are communicated towards the SGSN over the Iu interface. Preferably, this information is added to user-plane packets only after a change in the cell information is observed by the RNC. In one embodiment, the cell-level location information is carried in the GPRS Tunneling Protocol (GTP) Extension Header described in "3GPP TS 29.060 V3.7.0, GPRS Tunneling Protocol across the Gn and Gp Interface, Release 1999, 2002-12". Initially, the information may be a vendor-specific extension. If a node does not understand a certain extension in the header, the node answers with a list of extensions that are known by the node. Therefore the introduction of a new extension header does not cause interoperability problems.

In one exemplary embodiment, the transmission of cell-level location information can be switched off. In this way, the transmission of cell-level location information is active only during measurements.

In another exemplary embodiment, the cell-level location information is also forwarded on the Gn interface within the core network. In this case, the number of needed measurement points may be further decreased. The cell-level location information may also be encrypted before forwarding, and then decrypted in the monitoring device.

Thus, in one aspect, the invention is directed to a method of measuring packet-switched traffic in a packet-switched radio telecommunication network. The network includes a mobile station linked to a base station through a radio channel. The base station is linked to a radio access network, and the radio access network is linked to a support node in a packet core network. The method includes the steps of obtaining cell-level location information of the mobile station in a node in the radio access network; adding the obtained cell-level location information to user-plane packet headers; and transmitting the user-plane packets carrying the cell-level location information towards the packet core network. The cell-level location information is combined with packet data protocol (PDP) context information at a packet core network level. This is followed by measuring the cell-level location information (and other information, for example, the PDP context information) at the packet core network level.

In another aspect, the invention is directed to a method of measuring packet-switched traffic in a Universal Mobile Telecommunications System (UMTS) packet-switched radio telecommunication network having a plurality of mobile stations linked to a plurality of base stations through a plurality of radio channels. Each of the base stations is linked to a UMTS Terrestrial Radio Access Network (UTRAN), and a plurality of UTRANs are linked to a Serving General Packet Radio Service (GPRS) Support Node (SGSN) in a packet core network through an Iu interface link. The packet core network, in turn, is linked to a Gateway GPRS Support Node (GGSN) through a Gn interface link. The method includes the steps of passing cell-level location information for the mobile stations and PDP context information from the plurality of UTRANs to the SGSN via the Iu interface, or to the GGSN via the Iu interface links, the SGSN, the packet core network, and the Gn interface link. User-plane traffic for the entire network, including cell-level location information for the mobile stations and PDP context information combined from the plurality of UTRANs, is then measured on the Iu or the Gn interface link, respectively.

In yet another aspect, the invention is directed to a mobile telecommunication network for exchanging data packets. The telecommunication network includes an access network portion for connecting a plurality of mobile stations to the telecommunication network, a packet core network portion for connecting the access network portion to external networks, and at least one network monitoring device. The telecommunication network is characterized by the access network portion including nodes for transmitting data packets from the mobile stations towards the packet core network portion, wherein at least one of the nodes adds cell-level location information to the data packets that are transmitted towards the packet core network portion. In addition, the monitoring device is placed at a point in the telecommunication network where the monitoring device measures cell-level location information aggregated from a plurality of nodes.

In still yet another aspect, the invention is directed to a monitoring device for measuring and analyzing packet-switched traffic in a packet-switched radio telecommunication network. The monitoring device includes at least one measurement point for measuring cell-level location information of the mobile stations at a level in the network where the cell-level location information of a plurality of mobile stations is aggregated; and computing means for analyzing the measured aggregated cell-level location information. The monitoring device may also include means for obtaining PDP context information for the packet switched traffic and analyzing the PDP context information together with the measured cell-level location information for the entire network.

BRIEF DESCRIPTION OF THE DRAWINGS

In the following, the essential features of the invention will be described in detail by showing the prior-art and two preferred embodiments, with reference to the figures of the attached drawings.

DETAILED DESCRIPTION OF THE INVENTION

Figure 1:
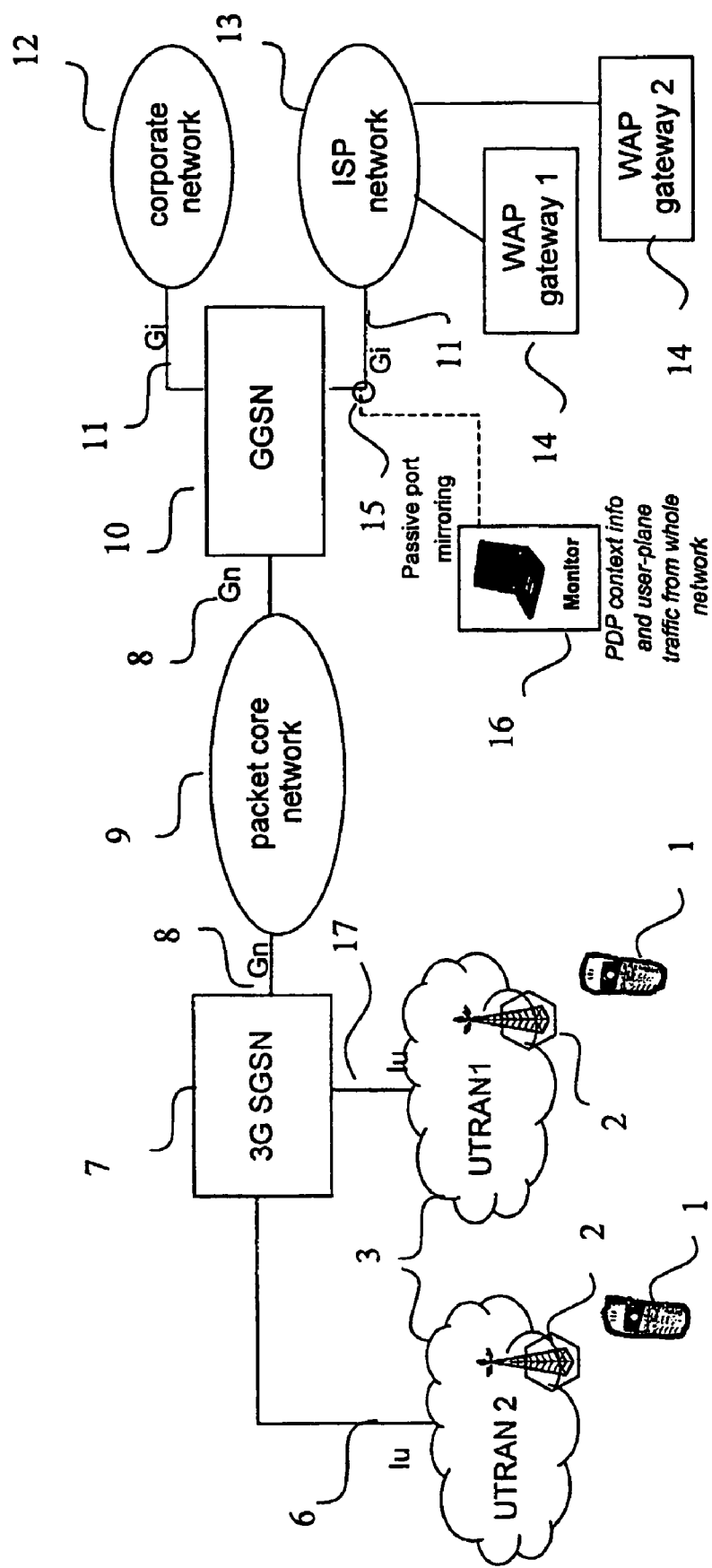
FIG. 1 is a block diagram showing a possible measurement arrangement according the location unaware prior-art solution.

In FIG. 1, an exemplary telecommunication network is shown according to the location unaware prior art solution, where mobile stations 1 communicate with base stations 2 through radio channels. The base stations are grouped to Radio Network Controllers 5, which are connected to a 3G SGSN 7 through Iu interfaces 6. The 3G SGSN is linked to a packet core network 9 and to a GGSN 10 through Gn interfaces 8. The GGSN is linked to a corporate network 12 and to an ISP network 13 through Gi interfaces 11. Additionally, two Wireless Application Protocol (WAP) Gateways 14 are connected to the ISP network. Measurement point 15 is attached to a link between the GGSN 10 and the ISP network 13, thereby accessing session information from the network.

The session management information in both GPRS and UMTS is communicated between the mobile stations and the core network (i.e., the network containing the SGSNs and GGSNs), and the relevant information (i.e., the PDP context) is available at the Gi interface, which aggregates the traffic of a large number of users. This prior art solution can be used to deliver network wide performance statistics. These statistics do not depend on the location of the data transfer.

Figure 2:
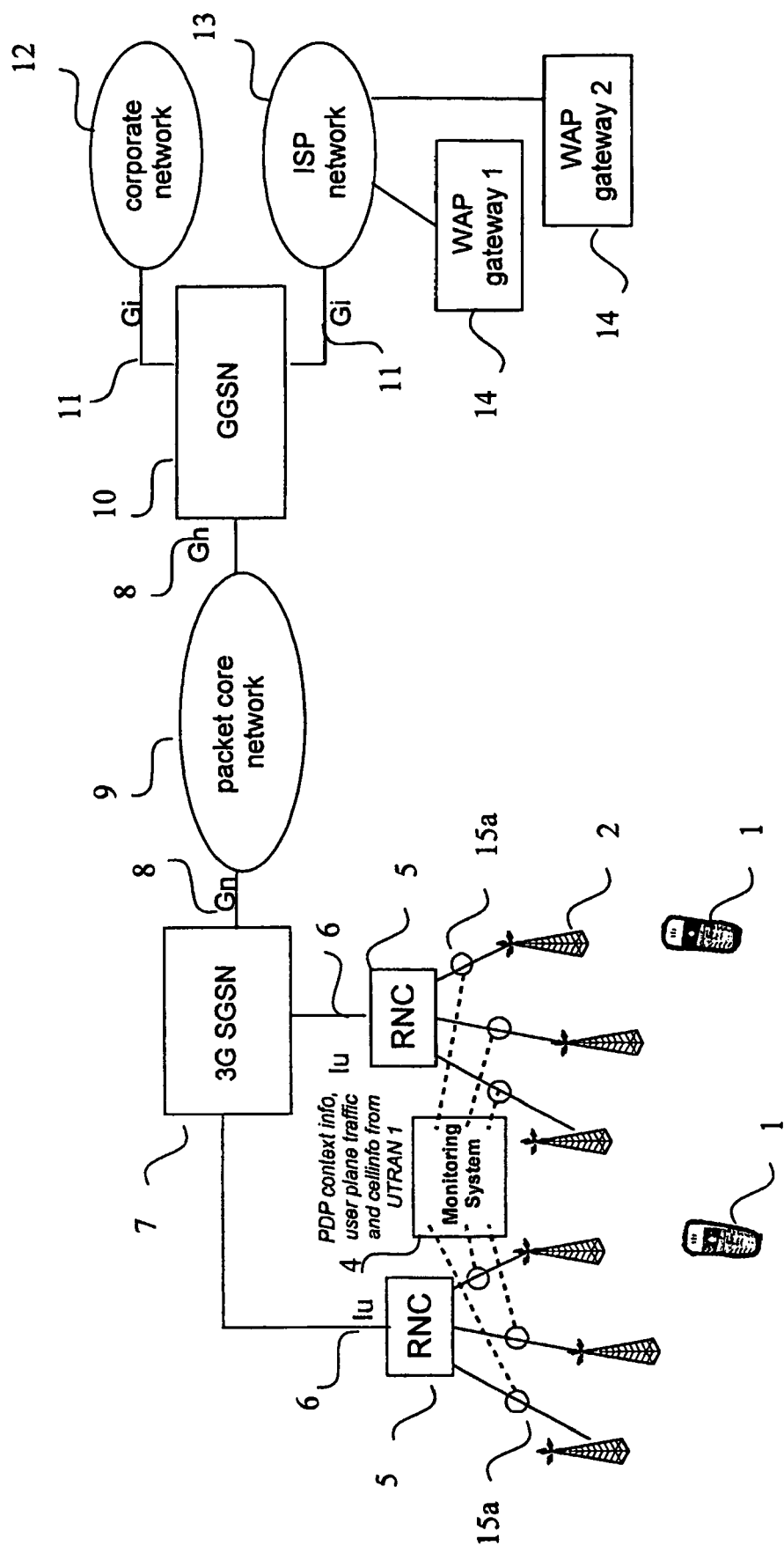
FIG. 2 is a block diagram showing a possible measurement arrangement according the location aware prior-art solution.

In FIG. 2, an exemplary telecommunication network is shown according to the location aware prior art. The network illustrated in FIG. 2 is similar to the network of FIG. 1 as far as the relations of the 3G SGSN 7, the packet core network 9, the GGSN 10, the corporate network 12, the ISP network 13, the WAP gateways 14, the mobile stations 1, and the base stations 2 are concerned. Measurement points 15a of a monitoring system 4 are attached to each link between the base stations 2 and the RNCs 5, thereby accessing cell-level location information from the UTRAN.

In this case, the cell-level location information is not sent on the Iu and Gn interfaces, and therefore the number of required measurement points 15a may be very high. In order to synchronize the traces collected at different measurement points 15a, the measurements are executed in parallel. This means that a simple solution, such as connecting a laptop equipped with the necessary tapping hardware and software to a measurement point, is not feasible.

Figure 3:
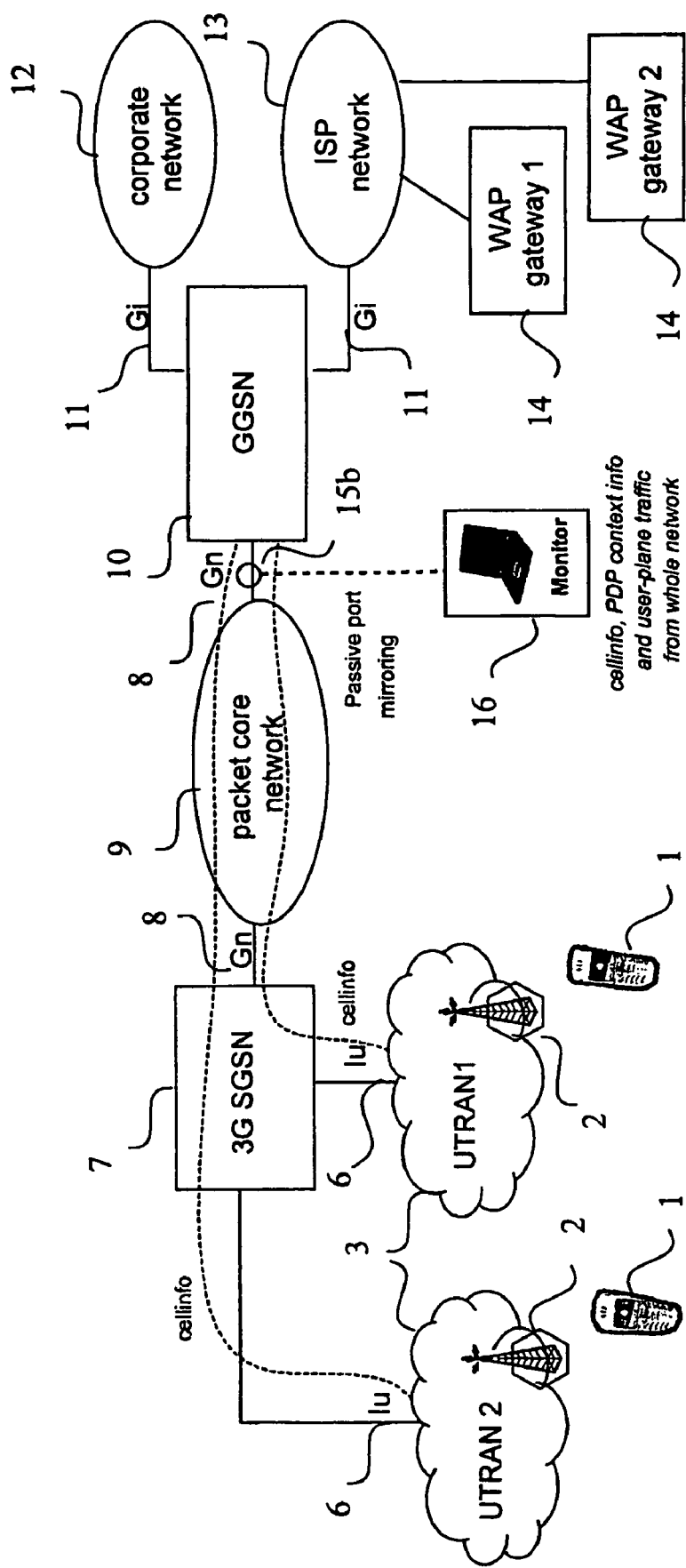
FIG. 3 is a block diagram depicting the preferred embodiment of a telecommunications network to be analyzed.

FIG. 3 is a block diagram depicting the preferred embodiment of a telecommunications network to be analyzed. Network elements are the same as shown in FIG. 2. In this embodiment, the cell-level location information (cellinfo) is obtained in the radio network controller (RNC) (not shown) in the UTRAN. The RNC is responsible for tracking the mobility of users, but normally keeps this information for its own use. In the present invention, the cell-level location information is added by the RNC to user data packets, and is then forwarded toward the packet core network. The packets are forwarded over the Gn interface 8, so one measurement point 15b at the Gn interface is sufficient.

Figure 4:
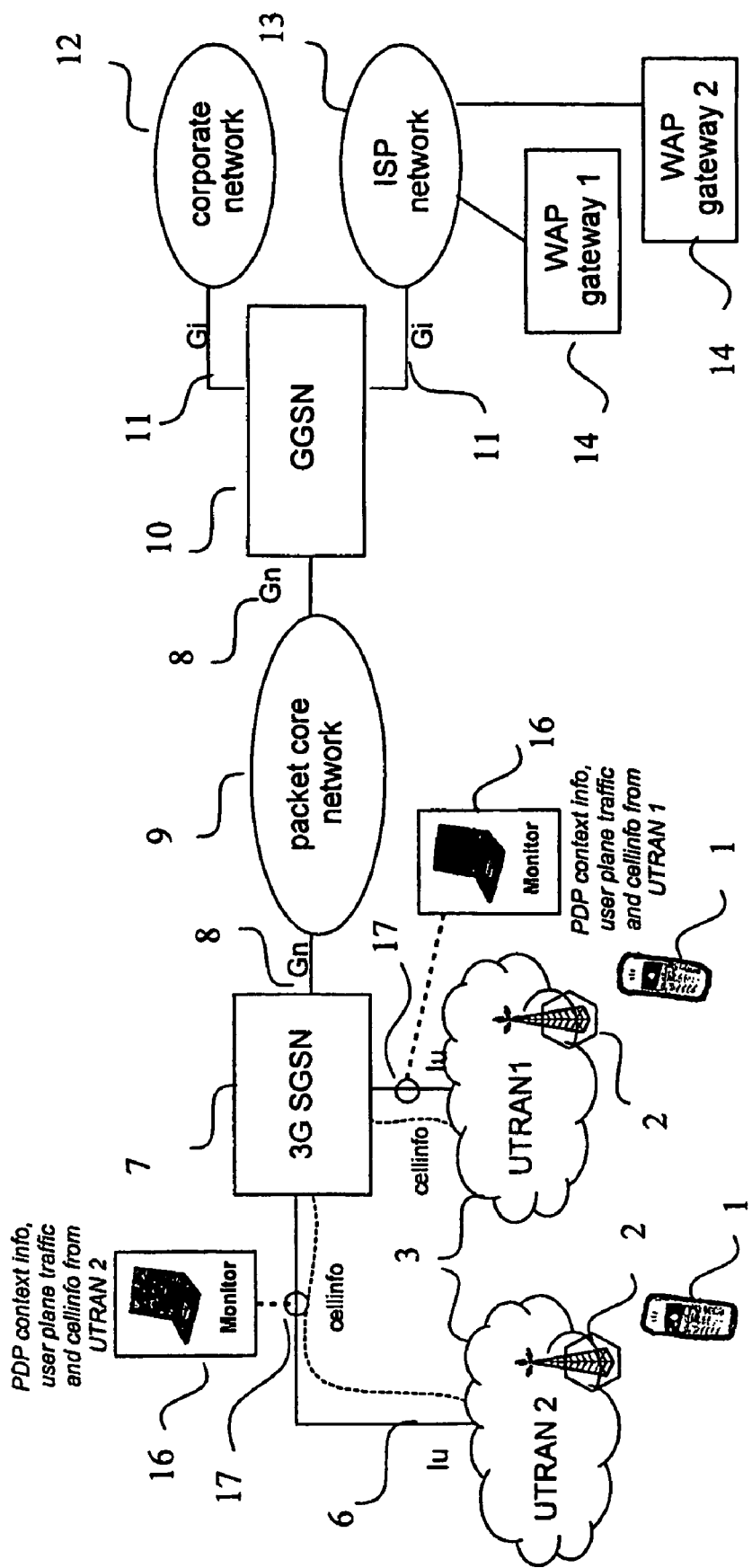
FIG. 4 is a block diagram depicting another embodiment of a telecommunications network to be analyzed.

FIG. 4 shows an exemplary telecommunication network according to one embodiment of the present invention. Network elements are the same as shown in FIG. 3 In FIG. 4, two UTRANs 3 are linked to the 3G SGSN 7 through Iu interfaces 6. Measurement points 17 are attached to the Iu interfaces thereby accessing cell-level location information (cellinfo) from the UTRANs at a higher aggregation level than the measurement points 15 in FIG. 2. Monitors 16 are connected to the measurement points 17.

As shown, the cell-level location information is signaled on the Iu interface link 6 between the UTRAN and the 3G SGSN, so measurement points 17 are needed on the Iu interface link 6 to collect the cell-level location information.

In GSM/GPRS networks, a mobile station communicates with only a single cell at a time. In CDMA-based networks, however, a mobile station may communicate with several cells at a time. These cells may be associated with one or more base stations. In the former case we speak about "softer" handover, while the latter is called "soft" handover.

When collecting cell-level traffic statistics in Wideband CDMA networks, packets transmitted during soft or softer handover can be taken into account by signaling the active set (AS) (i.e., the set of connected cells) after a change in the active set has occurred. Therefore, in the present invention, the following information may be communicated towards the core network:

|  | Cell id | Cell id | Flag | Meaning |
|---|---|---|---|---|
| Soft handover | Cell ID | — | ADD | Cell with "Cell ID" added to AS |
|  | Cell ID | — | DROP | Cell with "Cell ID" dropped from AS |
|  | Cell $ID_1$ | Cell $ID_2$ | REPLACE | Cell with "Cell $ID_1$" replaced by cell with "Cell $ID_2$" in the AS |
| Hard handover | Cell ID | — | REPLACE | Hard handover to cell with "Cell ID" |

If the network operator makes the measurement in its own network, it is easy to create a post-processing tool, which encrypts all the sensitive location information before analysis, as it is done today with, for example, the International Mobile Subscriber Identity (IMSI). In order to prevent the unauthorized seizure of this information via eavesdropping over the interface, the particular interface may be IPSec tunneled, or the information may be encrypted in the GTP header.

Figure 5:
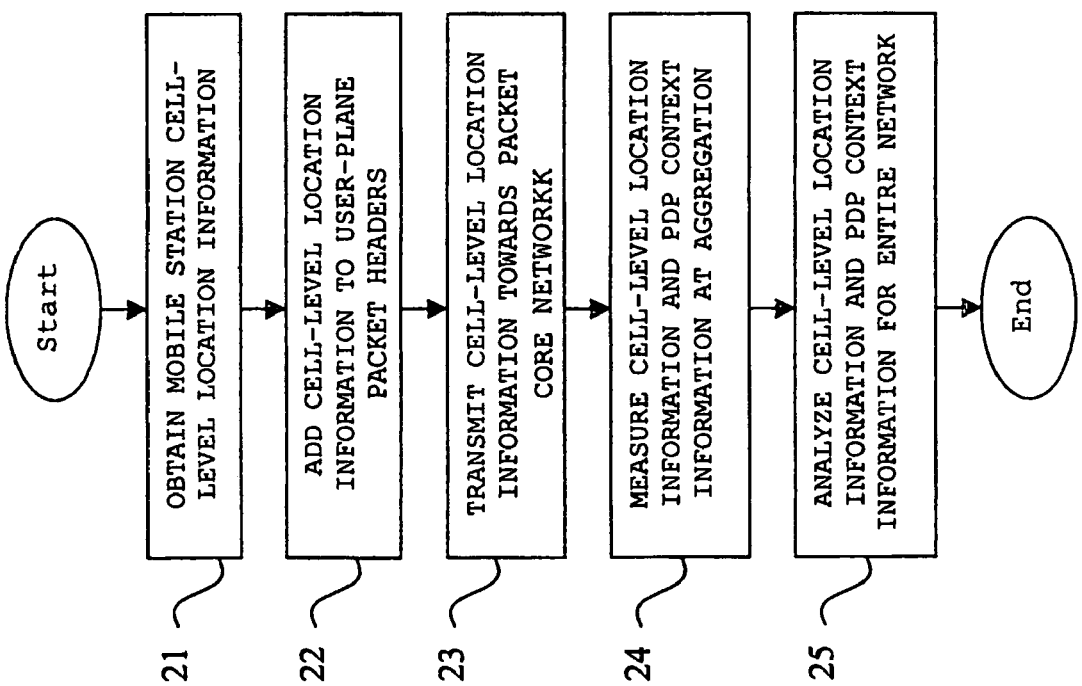
FIG. 5 is a flow chart showing the steps of the method of analyzing the network.

FIG. 5 is a flow chart showing the steps of the method of analyzing the network. At step 21, cell-level location information of the mobile stations is observed. At step 22, the cell-level location information is added to the user-plane packet headers. At step 23, the cell-level location information is transmitted towards the packet core network. At step 24, the cell-level location information, user traffic, and the PDP context information are measured at a higher aggregation level. Finally, at step 25, user-plane traffic from the entire network is analyzed, including cell-level location information and PDP context information.

Figure 6:
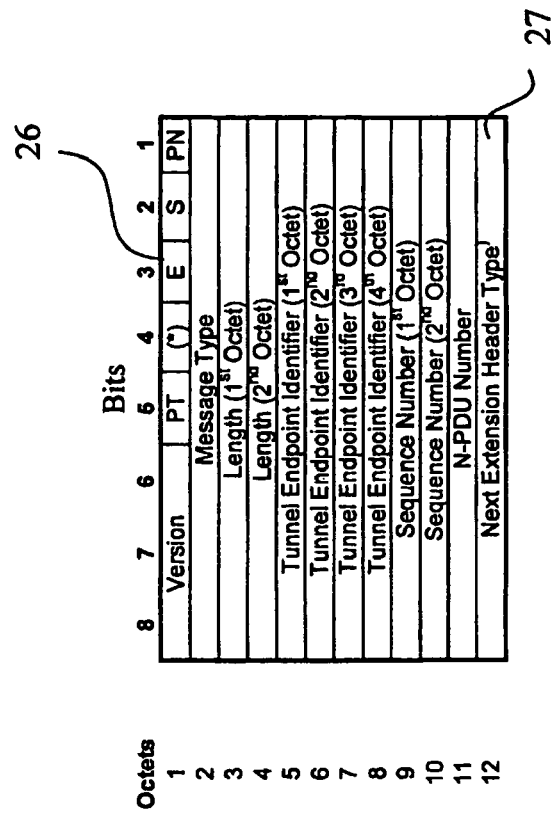
FIG. 6 is an exemplary bitmap illustrating the outline of a GTP header.
Figure 8:
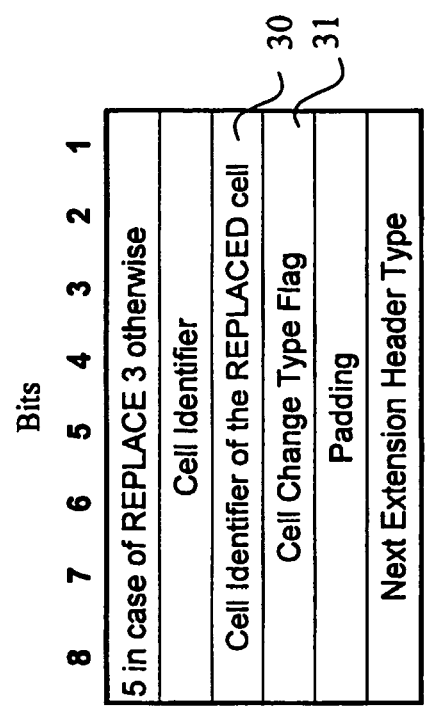
FIG. 8 is an exemplary Cell-Level Location Information Extension Header.
Figure 7:
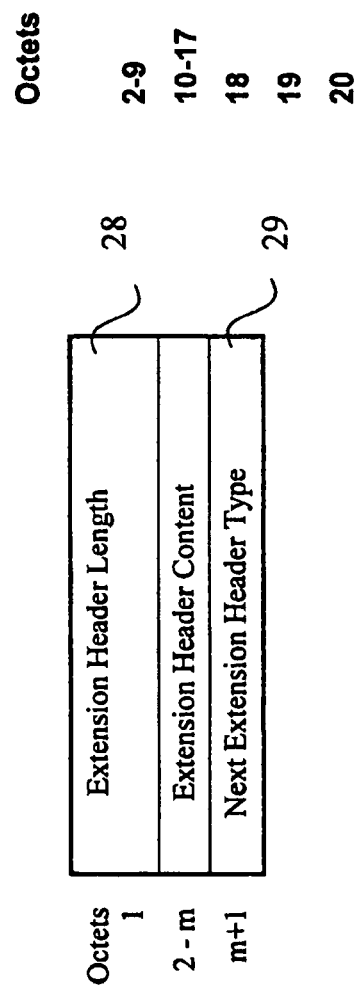
FIG. 7 is an exemplary bitmap showing the outline of an Extension Header Format.

FIGS. 6-8 outline one possible embodiment of the invention for carrying the cell-level location information in a UMTS network using standardized features of the GTP protocol.

FIG. 6 is an exemplary bitmap illustrating the outline of a GTP header. As described in 3GPP TS 29060, the GTP header is a variable length header used for both the GTP-C and the GTP-U protocols. There are three flags that are used to signal the presence of additional optional fields. Important for this invention is the so called 'E' flag 26, which is used to signal the presence of an Extension Header field. The Extension Header field is used to enable future extensions of the GTP header as defined herein, without the need to use another version number. If, and only if, one or more 'E' flags are set, the Extension Header will be present. The 'E' flag indicates the presence of a meaningful value of the Next Extension Header field. When the 'E' flag is set to '0', the Next Extension Header field is either not present, or if present, is not to be interpreted. When the 'E' flag is set to '1', the Next Extension Header field is present, and shall be interpreted, as described below. The Next Extension Header Type field 27 defines the type of Extension Header that follows this field in the GTP-PDU. Outline of the GTP header indicating the exact location of the 'E' flag 26 and the Next Extension Header Type field 27 is shown in the figure.

FIG. 7 is an exemplary bitmap showing the outline of an Extension Header Format. The Extension Header Length field 28 specifies the length of the particular extension header in 4 octets units. The Next Extension Header Type field 29 specifies the type of any extension header that may follow a particular extension header. If no such header follows, then the value of the Next Extension Header Type field 29 shall be '0'. To indicate the presence of cell-level location information, the value of the Next Extension Header Field may be set to '00000011'. The length of the Extension header is defined in a variable length of 4 octets, i.e. m+1=n*4 octets, where n is a positive integer.

FIG. 8 is an exemplary Cell-Level Location Information Extension Header. Fields for Cell Identifier of the REPLACED cell 30 are present if the Cell Change Type Flag 31 indicates 'REPLACE'. The identified cell is the cell being replaced in the active set. The detailed coding of the Cell Identifier is as follows:

| | 8 | 7 | 6 | 5 | 4 | 3 | 2 | 1 |
|---|---|---|---|---|---|---|---|---|
| octets 1-6 | Octets 1 to 6 contain the value part (starting with octet 2) of the Routing Area Identification IE defined in 3GPP TS 04.08, not including 3GPP TS 04.08 IEI | | | | | | | |
| octets 7-8 | Octets 7 and 8 contain the value part (starting with octet 2) of the Cell Identity IE defined in 3GPP TS 04.08 not including 3GPP TS 04.08 IEI | | | | | | | |

The value of the Cell Change Type flag 31 is coded as follows:

| Value | Meaning |
|---|---|
| 00000001 | ADD |
| 00000010 | DROP |
| 00000011 | REPLACE |

Although two preferred embodiments of the present invention have been illustrated in the accompanying drawings and described in the foregoing Detailed Description, it is understood that the invention is not limited to the embodiment disclosed, but is capable of numerous rearrangements, modifications, and substitutions without departing from the scope of the invention. For example, although embodiments are described above with reference to UMTS communications network, the present invention is applicable to any type of mobile telecommunications network. The specification contemplates any all modifications that fall within the scope of the invention defined by the following claims.

What is claimed is:

1. A method of measuring and analyzing packet-switched traffic in a Universal Mobile Telecommunications System, UMTS, network having a mobile station linked to a base station through a radio channel, the base station being linked to a radio access network, and the radio access network being linked to a support node in a packet core network, wherein cell-level location information of the mobile station is obtained in a node in the radio access network, said method comprising:
    adding the obtained cell-level location information to user-plane packet headers when the radio access network detects that the mobile station is performing a handover;
    transmitting the user-plane packets carrying the cell-level location information towards the packet core network;
    measuring the cell-level location information, user data traffic, and packet data protocol, PDP, context information at the packet core network level; and
    determining end-to-end quality-of-service, QoS, metrics for the mobile station by analyzing the cell-level location information, user data traffic, and PDP context information measured at the packet core network level.

2. The method of claim 1, wherein the step of measuring the cell-level location information includes measuring cell-level location information, user data traffic, and PDP context information in a plurality of radio access networks.

3. The method of claim 2, wherein the step of measuring the cell-level location information and the PDP context information at the packet core network level includes measuring the cell-level location information and the PDP context information at an aggregation level at which user-plane traffic from the entire network is combined.

4. The method of claim 1, wherein the handover is a hard handover, and the cell-level location information includes an identity of a new cell where the mobile station is located.

5. The method of claim 1, wherein the handover is a soft handover, and the cell-level location information includes an identification of the cells in a new active set of cells.

6. The method of claim 1, wherein the steps of adding the obtained cell-level location information to user-plane packet headers, and transmitting the user-plane packets carrying the cell-level location information towards the packet core network are performed only when cell-level location information is being measured.

7. The method of claim 1, wherein the radio access network is a UMTS Terrestrial Radio Access Network, UTRAN, and the support node is a Serving GPRS Support Node, SGSN, and the step of measuring cell-level location information of the mobile station includes measuring the cell-level location information on an Iu interface link between the UTRAN and the SGSN.

8. The method of claim 7, wherein the step of measuring the cell-level location information and the PDP context information at the packet core network level includes measuring the cell-level location information and the PDP context information for the entire network on a Gn interface between the packet core network and a Gateway GPRS Support Node, GGSN.

9. The method of claim 8, wherein the step of adding the obtained cell-level location information to user-plane packet headers includes adding the obtained cell-level location information to a General Packet Radio Service Tunneling Protocol, GTP, extension header.

10. The method of claim 9, wherein the step of adding the obtained cell-level location information to a GTP extension header includes encrypting the cell-level location information.

11. The method of claim 1, wherein the UMTS network includes a plurality of mobile stations linked to a plurality of base stations through a plurality of radio channels, each of the base stations being linked to a UMTS Terrestrial Radio Access Network, UTRAN, and a plurality of UTRANs being linked via a plurality of Iu interface links to a Serving General Packet Radio Service Support Node, SGSN, in a packet core network, wherein the measuring step includes measuring the cell-level location information for the plurality of mobile stations and the PDP context information on the plurality of Iu interface links between the UTRANs and the SGSN.

12. The method of claim 11, wherein the packet core network is linked to a Gateway GPRS Support Node, GGSN, through a Gn interface link, and the method includes the steps of:
passing the cell-level location information for the mobile stations and PDP context information from the plurality of UTRANs to the GGSN via the Iu interface links, the SGSN, the packet core network, and the Gn interface link;
measuring on the Gn interface link, user-plane traffic for the entire network, said user-plane traffic including the cell-level location information for the mobile stations and the PDP context information combined from the plurality of UTRANs; and
determining the end-to-end QoS metrics for the mobile station by analyzing the cell-level location information and PDP context information for the entire network.

13. A Universal Mobile Telecommunication System, UMTS, network for exchanging data packets, said telecommunication network including an access network portion for connecting a plurality of mobile stations to the telecommunication network, a packet core network portion for connecting the access network portion to external networks, and at least one network monitoring device, wherein the access network portion includes nodes for transmitting data packets from the mobile stations towards the packet core network portion, said UMTS network comprising:
means within at least one of said nodes in the access network portion for adding cell-level location information to the data packets that are transmitted towards the packet core network portion when the access network portion detects that one of the mobile stations is performing a handover; and
an aggregate measurement point in the telecommunication network where the monitoring device measures cell-level location information aggregated from a plurality of nodes;
wherein the monitoring device determines end-to-end quality-of-service, QoS, metrics for the mobile station by analyzing the cell-level location information and PDP context information for the plurality of nodes.

14. A monitoring device for measuring and analyzing packet-switched traffic in a Universal Mobile Telecommunication System, UMTS, radio telecommunication network having a plurality of mobile stations linked to a plurality of base stations through a plurality of radio channels, each the base station being linked to a radio access network, and a plurality of radio access networks being linked to a support node in a packet core network, said monitoring device characterized by:
at least one measurement point for measuring cell-level location information of the mobile stations at a level in the network where the cell-level location information of a plurality of mobile stations is aggregated, wherein the cell-level location information is included in user-plane racket headers only when the radio access network detects that one of the mobile stations is performing a handover; and
computing means for determining end-to-end quality-of-service, QoS, metrics for the mobile station by analyzing the measured aggregated cell-level location information.

15. The monitoring device of claim 14, further comprising means for obtaining packet data protocol, PDP, context information for the packet switched traffic, wherein the computing means includes means for analyzing the PDP context information together with the measured cell-level location information for the entire network.

* * * * *